United States Patent
Hara et al.

(10) Patent No.: US 9,007,021 B2
(45) Date of Patent: Apr. 14, 2015

(54) INSTALLATION STRUCTURE FOR CHARGING EQUIPMENT IN REAR VEHICLE BODY

(75) Inventors: Nobuhiko Hara, Shizuoka-ken (JP); Masahiro Asou, Shizuoka-ken (JP)

(73) Assignee: Suzuki Motor Corporation, Shizuoka-ken (JP)

( * ) Notice: Subject to any disclaimer, the term of this patent is extended or adjusted under 35 U.S.C. 154(b) by 364 days.

(21) Appl. No.: 13/642,031

(22) PCT Filed: Apr. 11, 2011

(86) PCT No.: PCT/JP2011/058970
§ 371 (c)(1),
(2), (4) Date: Oct. 18, 2012

(87) PCT Pub. No.: WO2011/148725
PCT Pub. Date: Dec. 1, 2011

(65) Prior Publication Data
US 2013/0038287 A1    Feb. 14, 2013

(30) Foreign Application Priority Data

May 26, 2010    (JP) ................................ 2010-120360

(51) Int. Cl.
*H02J 7/00*    (2006.01)
*B62D 43/10*    (2006.01)
(Continued)

(52) U.S. Cl.
CPC .............. *B62D 43/10* (2013.01); *B62D 25/087* (2013.01); *B60Y 2400/61* (2013.01); *B60K 2015/053* (2013.01)

(58) Field of Classification Search
USPC ................................................ 320/107, 109
See application file for complete search history.

(56) References Cited

U.S. PATENT DOCUMENTS 6,188,574 B1   2/2001 Anazawa
6,854,543 B2 *  2/2005 Rowley et al. ............... 180/68.5
(Continued)

FOREIGN PATENT DOCUMENTS

JP    3-125682 U    12/1991
JP    2000-040535 A    2/2000
(Continued)

OTHER PUBLICATIONS

International Search Report for Application No. PCT/JP2011/058970 dated July 5, 2011.

*Primary Examiner* — Richard V Muralidar
(74) *Attorney, Agent, or Firm* — Alston & Bird LLP

(57) ABSTRACT

There is provided the installation structure for charging equipment in a rear vehicle body capable of enhancing rigidity of the rear vehicle body, performing roundabout installation of the outlet cable without applying large load to the cable, preventing deterioration of the charging equipment due to external factors, and readily installing the charging equipment. In the installation structure for charging equipment in a rear vehicle body, the charger 10 for charging a battery is disposed in the spare tire housing 3, the charging connector 11 connected to the charger 10 through the outlet cable 12 is disposed rearward of the vehicle in the spare tire housing 3 so as to supply power to the charger 10, the insertion hole 3b is formed in the peripheral wall 3a of the spare tire housing 3, the cover member 4 is joined to the rear floor panel 2 so as to form a closed cross section, the cover member 4 is disposed to extend from the peripheral wall 3a of the spare tire housing 3 toward the charging connector 11 so as to communicate the space defined by the closed cross section with the insertion hole 3b, and the outlet cable 12 is disposed so as to be inserted through the insertion hole 3b and the space defined by the closed cross section.

3 Claims, 4 Drawing Sheets

(51) Int. Cl.
*B62D 25/08* (2006.01)
*B60K 15/05* (2006.01)

(56) References Cited

U.S. PATENT DOCUMENTS 7,051,825 B2 * 5/2006 Masui et al. ............... 180/68.5
8,622,161 B2 * 1/2014 Hara ........................ 180/65.31

2008/0274397 A1 11/2008 Watanabe

FOREIGN PATENT DOCUMENTS

| | | |
|---|---|---|
| JP | 2006-062548 A | 3/2006 |
| JP | 2007-161074 A | 6/2007 |
| JP | 2008-037135 A | 2/2008 |
| JP | 2008-062780 A | 3/2008 |
| JP | 2009-146711 A | 7/2009 |

* cited by examiner

INSTALLATION STRUCTURE FOR CHARGING EQUIPMENT IN REAR VEHICLE BODY

TECHNICAL FIELD

The present invention relates to a structure for installing charging equipment such as a charger, a charging connector, and an outlet cable for connecting the charger and the charging connector in a rear vehicle body.

BACKGROUND ART

Recently, an increasing number of hybrid vehicles have been widely used as environmentally friendly vehicles in consideration of the environment. Such an environmentally friendly vehicle is capable of charging a battery through an external plug such as a domestic power supply, and more plug-in hybrid vehicles and electric vehicles have begun to be used, which are driven by using power from a battery charged in such a manner.

Such an environmentally friendly vehicle is equipped with a battery of a relatively large size. Not only a battery, but also charging equipment, such as a charger for charging the battery, a charging connector, and an outlet cable for connecting the charger to the charging connector, is installed in a plug-in hybrid vehicle and an electric vehicle. Therefore, a special structure is employed in such an environmentally friendly vehicle in consideration of arrangement of a battery, charging equipment and the like, and an increasing number of new special vehicle bodies have been developed for such environmentally friendly vehicles. Unfortunately, it is costly to develop a new special vehicle body, and thus it has been desired to develop an environmentally friendly vehicle at low cost.

In order to satisfy such needs, Patent Document 1 proposes an environmentally friendly vehicle produced by utilizing a vehicle body of a conventional vehicle. Patent Document 1 discloses a structure of a vehicle having a spare tire housing which is disposed at a substantially center of a rear floor panel in a rear vehicle body and has a recessed shape projecting downward of a vehicle body, and in such a vehicle structure, a battery is installed so as to occupy the entire space of the spare tire housing. In the structure of Patent Document 1, a charger which is a relatively larger component among the charging equipment can be installed in the spare tire housing, thus it is supposed to form a hole for inserting the outlet cable through the spare tire housing so that an outlet cable for connecting the charger and a charging connector is installed all the way around in a short route.

CITATION LIST

Patent Literature

Patent Document 1: Japanese Patent Publication No. 2006-062548

SUMMARY OF INVENTION

Technical Problem

Unfortunately, the charging connector among the charging equipment is disposed in the vicinity of an outer surface of the vehicle so as to be connected to an external plug when charging, and thus the distance between the charging connector and the charger installed in the spare tire housing becomes longer in the structure of Patent Document 1. In particular, in the case in which the spare tire housing is disposed with a distance from an edge of a rear floor panel, and a peripheral wall is formed around the entire circumference of the spare tire housing, an outlet cable for connecting the charging connector to the charger is needed to be installed all the way through a long route. In this case, the outlet cable must be installed along the bottom of the spare tire housing in the horizontal direction, and along the peripheral wall of the spare tire housing in the vertical direction, and then along the upper face of the rear floor panel in the horizontal direction. Since there are provided various structures such as trim, interior sheet, and other components on the upper face of the rear floor panel, the outlet cable should be installed all the way around these structures. As a result, installation operation of the charging equipment including the roundabout installation of the outlet cable becomes complicated. Such roundabout installation of the outlet cable causes waving of the outlet cable vertically and horizontally, which applies great load onto the outlet cable.

The outlet cable may be exposed to the outside between the rear floor panel and the charging connector disposed in the vicinity of the outer surface of the vehicle body in some cases. In the rear vehicle body in such a case, air that flowed from the vehicle front and through between the bottom face of the vehicle and a road surface is led upward by the rear bumper, so that muddy water and stones splashed by the rear wheels may be carried in the airflow so as to come in contact with the outlet cable. Hence, the outlet cable is likely to be deteriorated.

If a hole is formed in the rear floor panel for the sake of roundabout installation of the outlet cable in a short route, there occurs a difficulty that deterioration is caused in rigidity of the rear floor panel, particularly rigidity of the rear vehicle body against load applied from the rear of the vehicle. In addition, muddy water and stones enter through the hole formed in the rear floor panel, so that the charging equipment such as the charger, the charging connector and the outlet cable is likely to be deteriorated.

The present invention has been made in the light of the abovementioned facts, and has an object to provide an installation structure for charging equipment in a rear vehicle body capable of enhancing rigidity of the rear vehicle body, performing roundabout installation of the outlet cable without applying great load to the cable, preventing deterioration of the charging equipment due to an external factor, and readily installing the charging equipment.

Solution to Problem

In order to solve the above problem, the installation structure for charging equipment in a rear vehicle body includes a rear floor panel disposed in the horizontal direction in the rear vehicle body; a spare tire housing disposed at a position with a distance in a longitudinal direction of the vehicle from a rear edge of a rear floor panel, the spare tire housing having a recessed shape projecting downward of the vehicle; a charger for charging a battery mounted on the vehicle, which is disposed in the spare tire housing; a charging connector connected to the charger through an outlet cable, and the charging connector is configured to be capable of supplying power to the charger; in the installation structure for charging equipment in a rear vehicle body, the charging connector is disposed rearward of the vehicle in the spare tire housing, an insertion hole is formed in a peripheral wall of the spare tire housing, a cover member along with the rear floor panel forms a closed cross section, the cover member is disposed to extend from the peripheral wall of the spare tire housing toward the charging connector so as to communicate space defined by the closed cross section with the insertion hole, and the outlet cable is disposed so as to be inserted through the insertion hole and the space defined by the closed cross section.

In the installation structure for charging equipment in a rear vehicle body of the present invention, the insertion hole is disposed in the peripheral wall rearward of the vehicle in the spare tire housing.

In the installation structure for charging equipment in a rear vehicle body of the present invention, the cover member extends from the peripheral wall of the spare tire housing to a rear edge of the rear floor panel.

Advantageous Effects of Invention

The present invention attains the following advantageous effects. The installation structure for charging equipment in a rear vehicle body of the present invention includes a rear floor panel disposed in the horizontal direction in the rear vehicle body; a spare tire housing disposed at a position with a distance in a longitudinal direction of the vehicle from a rear edge of a rear floor panel, the spare tire housing having a recessed shape projecting downward of the vehicle; a charger for charging a battery mounted on the vehicle, which is disposed in the spare tire housing; a charging connector connected to the charger through an outlet cable, and the charging connector is configured to be capable of supplying power to the charger; in the installation structure for charging equipment in a rear vehicle body, the charging connector is disposed rearward of the vehicle in the spare tire housing, an insertion hole is formed in a peripheral wall of the spare tire housing, a cover member is joined to the rear floor panel so as to form a closed cross section, the cover member is disposed to extend from the peripheral wall of the spare tire housing toward the charging connector so as to communicate space defined by the closed cross section with the insertion hole, and the outlet cable is disposed so as to be inserted through the insertion hole and the space defined by the closed cross section. Hereby, it is possible to install the outlet cable for connecting the charger and the charging connector all the way around in a short route passing through the insertion hole with less waving of the cable in the vertical and lateral directions. Specifically, it is unnecessary to install the outlet cable along the bottom of the spare tire housing in the horizontal direction, along the peripheral wall of the spare tire housing in the vertical direction, and then along the upper face of the rear floor panel in the horizontal direction, and also to install the outlet cable all the way around to avoid the structures on the upper face of the rear floor panel, as the prior art does. Accordingly, it is possible to readily install the charging equipment such as the charger, the charging connector, and the outlet cable. Reduction of waving of the outlet cable in the vertical and lateral directions prevents great load from being applied to the outlet cable. Since the outlet cable is surrounded by the cover member and the insertion holes provided in the spare tire housing so as to insert the outlet cable is also surrounded by the cover member, it is possible to prevent deterioration of the charging equipment due to external factors such as muddy water and stones. Since the insertion hole of the spare tire housing is reinforced by the cover member, enhancement can be attained in rigidity of the rear vehicle body, particularly rigidity of the rear vehicle body against load applied from the rear of the vehicle body.

In the installation structure for charging equipment in a rear vehicle body of the present invention, the insertion hole is disposed in the peripheral wall rearward of the vehicle in the spare tire housing; thus load applied from the rear of the vehicle body can be easily transferred to the peripheral wall rearward of the vehicle in the spare tire housing through the cover member. Accordingly, enhancement can be attained in rigidity of the rear vehicle body and the charging equipment can be readily installed.

In the installation structure for charging equipment in a rear vehicle body of the present invention, the cover member extends from the peripheral wall of the spare tire housing to a rear edge of the rear floor panel; thus it is possible to securely prevent deterioration due to external factors such as muddy water and stones, as well as to readily install the charging equipment.

DESCRIPTION OF EMBODIMENT

Figure 1:
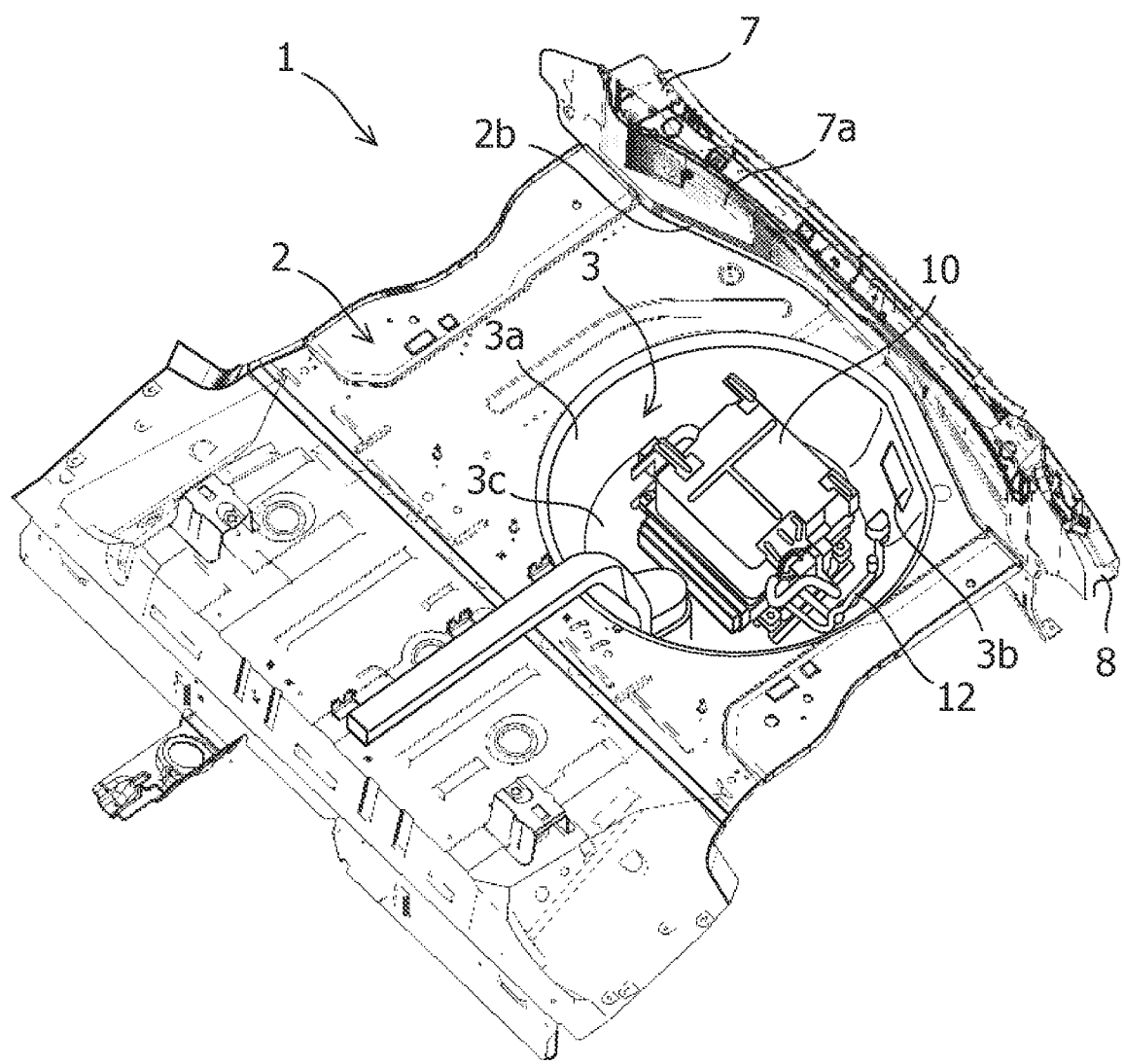
FIG. 1 is a schematic perspective view of the installation structure for charging equipment in a rear vehicle body according to the embodiment of the present invention, as seen from a front to a rear of the vehicle and from a diagonally upward and leftward position in the vehicle traveling direction.

Hereinafter, with reference to FIG. 1 to FIG. 5, description will be provided on the installation structure for charging equipment in a rear vehicle body (referred to as the "installation structure", hereinafter) 1 according to the embodiment of the present invention. The rear floor panel 2 is provided in the rear vehicle body. The spare tire housing 3 in a recessed shape projecting downward of the vehicle body is formed in the rear floor panel 2. The cover member 4 is attached onto the lower face 2a of the rear floor panel 2. The hook reinforcement member 6 for attaching the tow hook 5 is disposed onto the lower face 2a of the rear floor panel 2 in the spare tire housing 3. The back panel 7 extending in the vehicle width direction is disposed at the rear edge of the rear floor panel 2. The bumper member 8 is disposed onto the rear face 7a of the back panel 7. The outer panel 9 is disposed in the back of the back panel 7 and the bumper member 8. In the rear vehicle body, there are installed the charger 10 for charging the battery, the charging connector 11 connectable to the external plug (not illustrated), and the outlet cable 12 for connecting the charger 10 to the charging connector 11 as the charging equipment. The charger 10 is installed in the spare tire housing 3. The charging connector 11 is disposed at the connector connection port 13 rightward in the vehicle traveling direction of the outer panel 9.

Figure 5:
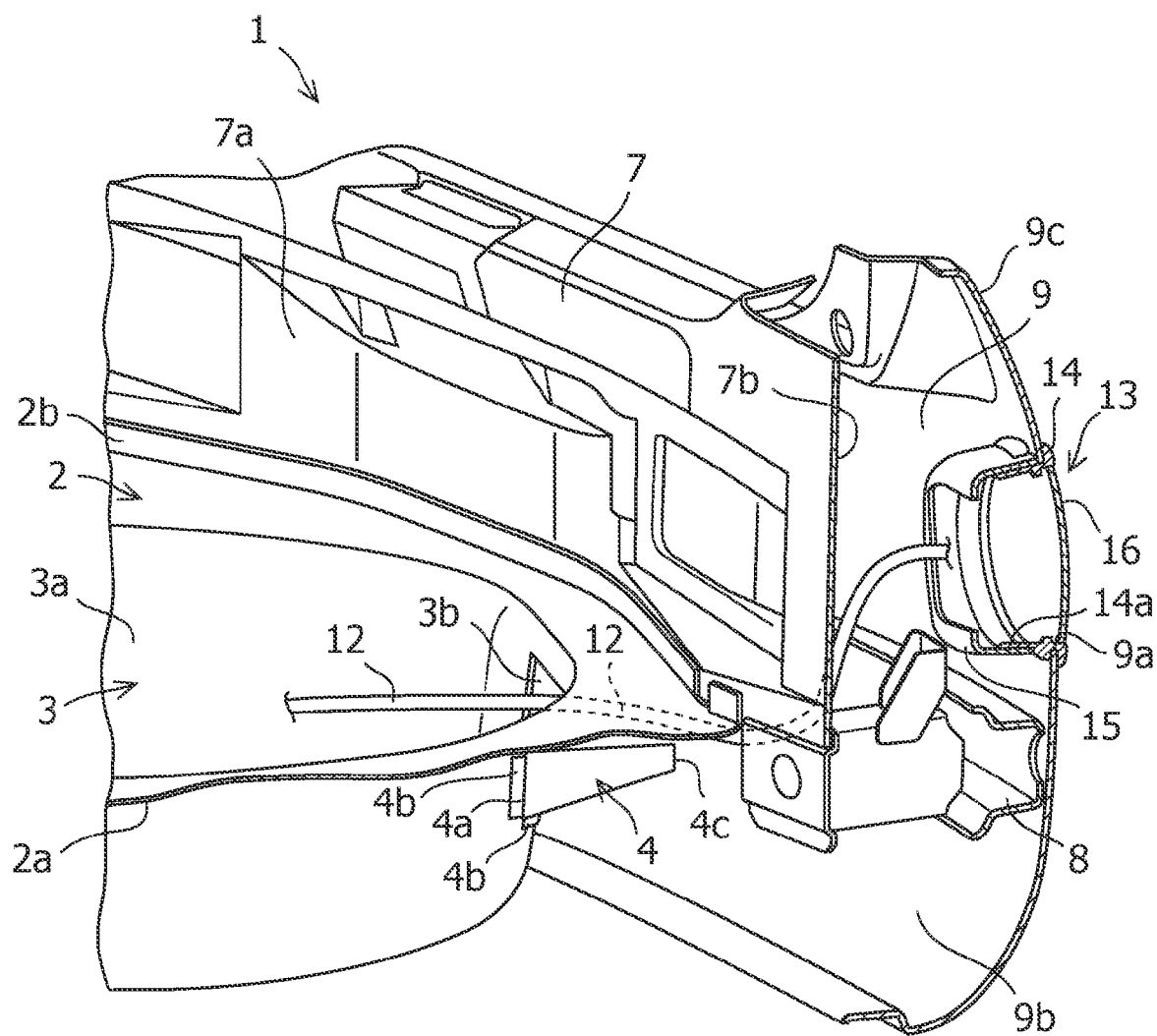
FIG. 5 is a schematic cross sectional view illustrating an installation layout of an outlet cable without illustrating the charger and the charging connector in the installation structure for charging equipment in a rear vehicle body according to the embodiment of the present invention.

Description will now be provided on the installation structure 1. With reference to FIG. 1 and FIG. 5, the spare tire housing 3 is disposed in the rear floor panel 2 in such a manner that the spare tire housing 3 is located leftward in the traveling direction of the vehicle of the rear floor panel 2 and at a position with a distance in the longitudinal direction of the vehicle from the rear edge of the rear floor panel 2. The spare tire housing 3 is formed such that a spare tire (not illustrated) laid horizontally can be installed therein. The peripheral wall 3a of the spare tire housing 3 is formed to be substantially liner at its rear portion leftward in the vehicle traveling direction. The insertion hole 3b is formed in the substantially linear portion of the peripheral wall 3a on the rear side of the vehicle.

Figure 4:
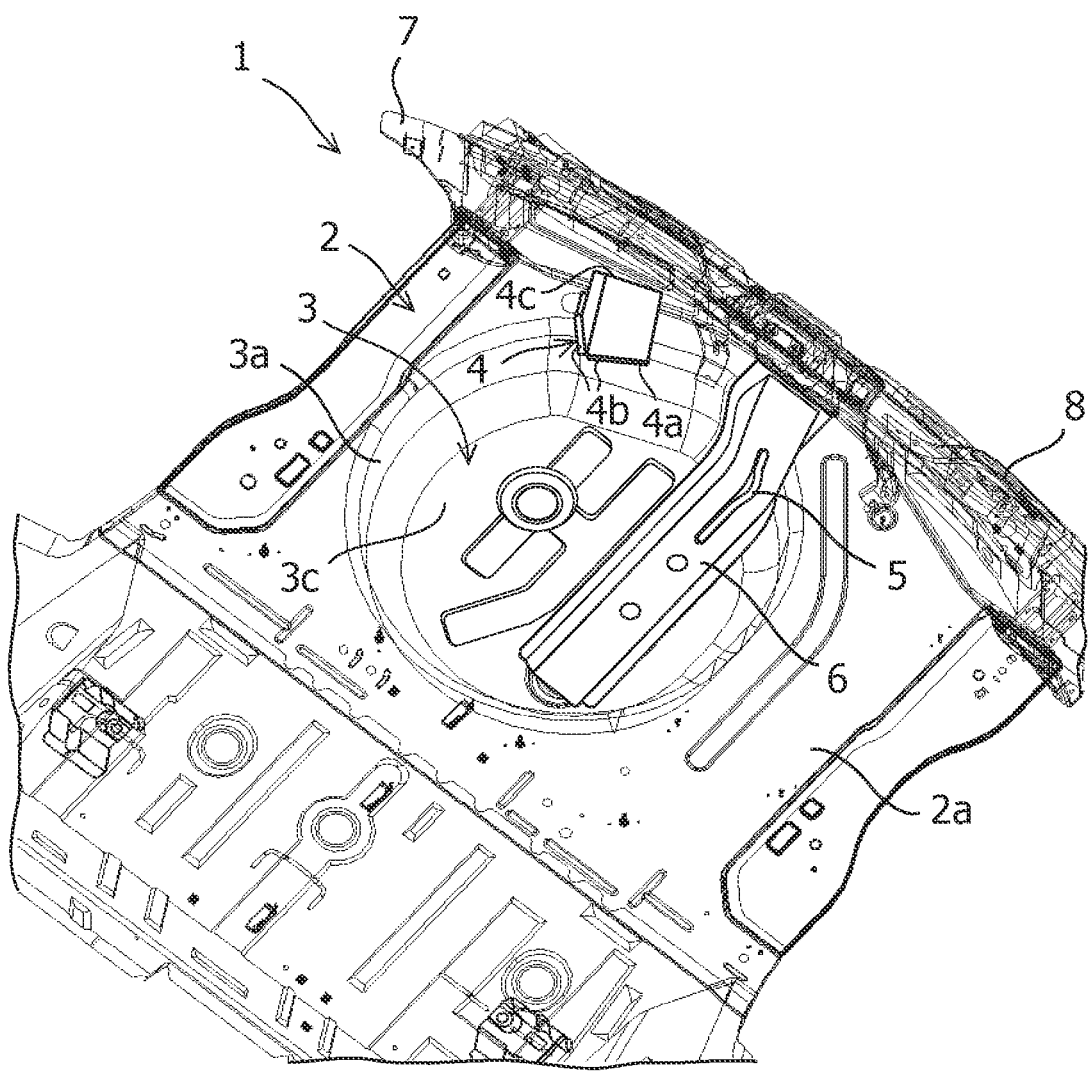
FIG. 4 is a schematic perspective view of the installation structure for charging equipment in a rear vehicle body according to the embodiment of the present invention, as seen from the rear to the front of the vehicle from a diagonally downward and rightward position in the vehicle traveling direction.

The cover member 4 is formed so as to extend toward the charging connector 11 from the peripheral wall 3a of the spare tire housing 3 to the rear edge of the rear floor panel 2, as illustrated in FIG. 4. Although not illustrated, the cover member 4 is formed to have a hat-shaped cross section projecting downward, and the upper flange of the hat-shaped cross section is joined onto the lower face 2a of the rear floor panel 2. Hereby, the rear floor panel 2 and the cover member 4 form a closed cross section, and space defined by this closed cross section is communicated with the insertion hole 3b. The flange 4b is provided at the front end 4a in the longitudinal direction of the cover member 4, and the flange 4b is joined to the outer periphery of the peripheral wall 3a of the spare tire housing 3. On the other hand, the rear end 4c in the longitudinal direction of the cover member 4 is opened.

As illustrated in FIG. 4, the hook reinforcement member 6 is formed so as to extend in the longitudinal direction of the vehicle from the front position in the bottom 3c of the spare tire housing 3 to the rear edge of the rear floor panel 2, along the spare tire housing 3 projecting on the lower face 2a of the rear floor panel 2. Although not illustrated, the hook reinforcement member 6 is formed to have a substantially hat-shaped cross section, and the upper flanges of the substantially hat-shaped cross section are joined to the peripheral wall 3a of the spare tire housing 3 and the lower face 2a at the rear end of the rear floor panel 2. The hook reinforcement member 6 is disposed rightward in the vehicle traveling direction relative to the center of the spare tire housing 3 (and/or the center of the vehicle width direction of the vehicle body). The hook reinforcement member 6 has an angled portion between the portion along the bottom 3c of the spare tire housing 3 and the portion along the peripheral wall 3a of the spare tire housing 3, and the tow hook 5 is attached to this angled portion.

The front face 7a of the back panel 7 is joined to the flange 2b extending upward from the rear edge of the rear floor panel 2, as illustrated in FIG. 4 and FIG. 5. The bumper member 8 attached to the rear face 7b of the back panel 7 is located at the approximately same height as that of the spare tire housing 3.

Figure 2:
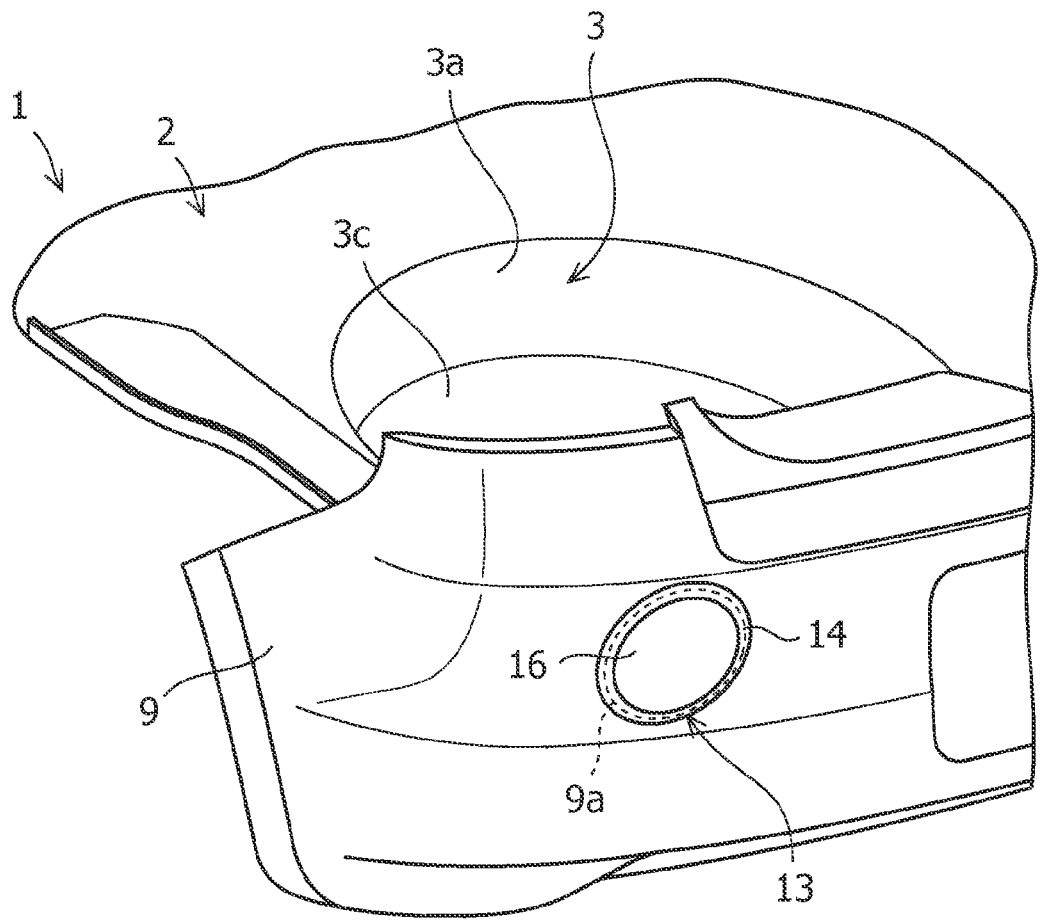
FIG. 2 is a schematic perspective view of illustrating a vicinity of a connection port of a charging connector disposed at an outer surface of the rear vehicle body according to the embodiment of the present invention, in a state in which a lid of the charging connector is closed.
Figure 3:
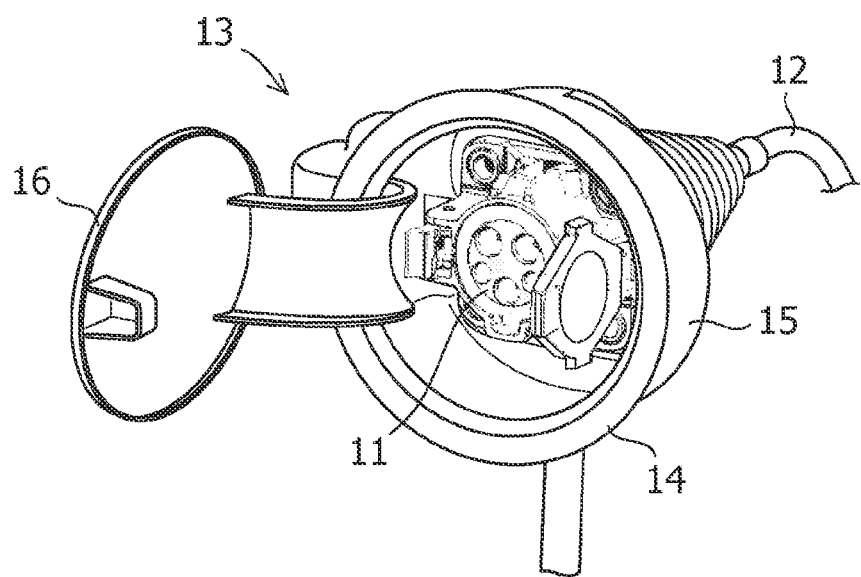
FIG. 3 is a schematic perspective view of illustrating the connection port of the charging connector disposed onto an outer surface of the rear vehicle according to the embodiment of the present invention, in a state in which the lid of the charging connector is opened.

The connector connection port 13 of the outer panel 9 will be described with reference to FIG. 2, FIG. 3, and FIG. 5. The connection hole 9a is formed in the outer panel 9 so that the charging connector 11 can be exposed to the outside of the vehicle. The connection port frame 14 in an approximately ring shape is attached along the periphery of the connection hole 9a. The connection port frame 14 is provided with the projection 14a projecting frontward of the vehicle at the front face 9b of the outer panel 9. The connector housing 15 is configured to have a substantially cup shape, and to house the charging connector 11 to be attachable thereto, and the connector housing 15 is attached to the projection 14a of the connection port frame 14. The lid 16 is attached at the connection port frame 14 along the outer panel 9, and the lid 16 is configured to open and close the connector connection port 13 at the rear face 9c of the outer panel 9.

The charging equipment will be described. With reference to FIG. 1, the charger 10 is disposed onto the upper face of the bottom 3c of the spare tire housing 3. Although not illustrated, the charging connector 11 is housed in and attached to the connector housing 15, and in the state in which the lid 16 is opened, the connection portion of the charging connector 11 for connecting to the external plug is exposed to the outside of the vehicle as illustrated in FIG. 3.

With reference to FIG. 5, the outlet cable 12 is installed in such a manner that the outlet cable 12 is inserted in the insertion hole 3b of the spare tire housing 3, through the closed space defined by the rear floor panel 2 and the cover member 4, and is horizontally installed in an substantially linear state through the section to the aperture of the rear end 4c of the cover member 4. The outlet cable 12 coming out of the aperture of the rear end 4c of the cover member 4 turns its direction upward to extend upward in the space between the back panel 7 and the outer panel 9, and then turns its direction horizontally in the vicinity of the connection portion of the charging connector 11 to the outlet cable 12 so as to be connected to the charging connector.

Description will now be provided on the installation steps of the charging equipment in the embodiment of the present invention. The charger 10 equipped with the outlet cable 12 is installed onto the upper face of the bottom 3c of the spare tire housing 3, and the charging connector 11 is housed and mounted in the connector housing 15. The outlet cable 12 is inserted into the insertion hole 3b of the spare tire housing 3, and is installed through the space defined by the closed cross section formed by the rear floor panel 2 and the cover member 4, to the aperture of the rear end 4b of the cover member 4. The outlet cable 12 coming out of the aperture of the rear end 4c of the cover member 4 is extended through the space between the back panel 7 and the outer panel 9 so as to be connected to the charging connector 11.

As described above, according to the embodiment of the present invention, the outlet cable 12 for connecting the charger 10 to the charging connector 11 can be installed in a short route passing through the insertion hole 3b of the spare tire housing 3. As illustrated in FIG. 5, it is possible to install the outlet cable 12 with less waving of the cable in the vertical and lateral directions by changing the installation direction of the outlet cable 12 at only two positions. Specifically, it is unnecessary to install the outlet cable along the bottom of the spare tire housing in the horizontal direction, along the peripheral wall of the spare tire housing in the vertical direction, and then along the upper face of the rear floor panel in the horizontal direction, and also to install the outlet cable all the way around the structures on the upper face of the rear floor panel, as the prior art does. Accordingly, it is possible to readily install the charging equipment such as the charger 10, the charging connector 11 and the outlet cable 12. Reduction of waving of the outlet cable 12 in the vertical and lateral directions prevents great load from being applied to the outlet cable 12. Since the outlet cable 12 is surrounded by the cover member 4 and the insertion hole 3b provided in the spare tire housing 3 so as to insert the outlet cable 12 is also surrounded by the cover member 4, it is possible to prevent deterioration of the charging equipment due to external factors such as muddy water and stones. Since the insertion hole 3b of the spare tire housing 3 is reinforced by the cover member 4, enhancement can be attained in rigidity of the rear vehicle body, particularly rigidity of the rear vehicle body against load applied from the rear of the vehicle body.

According to the embodiment of the present invention, since the insertion hole 3b is formed in the peripheral wall 3a rearward of the vehicle in the spare tire housing 3, load applied from the rear of the vehicle body is readily transferred to the peripheral wall 3a rearward of the vehicle in the spare tire housing 3 through the cover member 4. Accordingly, enhancement can be attained in rigidity of the rear vehicle body as well as the charging equipment can be readily installed.

According to the embodiment of the present invention, since the cover member 4 extends from the peripheral wall 3a of the spare tire housing 3 to the rear edge of the rear floor panel 2, it is possible to securely prevent deterioration due to external factors such as muddy water and stones by the cover member 4, as well as to readily install the charging equipment.

As described above, the embodiment of the present invention has been explained, but the present invention is not limited to the above described embodiment, and various modifications and changes can be made based on the technical idea of the present invention.

As the first modified example of the embodiment of the present invention, the insertion hole 3b may be formed in any portion other than the peripheral wall 3a rearward of the vehicle in the spare tire housing 3. For example, the insertion hole 3b may be formed in the peripheral wall 3a either rightward or leftward of the vehicle width direction in the spare tire housing 3, or may be formed in the peripheral wall 3a frontward of the vehicle in the spare tire housing 3. As similar to the embodiment of the present invention, it is facilitated to install the charging equipment and it is possible to prevent deterioration of the charging equipment due to external factors.

As the second modified example of the embodiment of the present invention, the cover member 4 may be provided rightward in the vehicle traveling direction, and in this case, the spare tire housing 3 may be disposed rightward in the vehicle traveling direction, and the hook reinforcement member 6 may be disposed leftward in the vehicle traveling direction relative to the center of the spare tire housing 3. The same effects can be attained as those of the embodiment of the present invention.

REFERENCE SIGNS LIST

1 Installation structure for charging equipment in a rear vehicle body (installation structure)
2 Rear floor panel
3 Spare tire housing
3a Peripheral Wall
3b Insertion hole
4 Cover member
7 Back panel
10 Charger
11 Charging connector
12 Outlet cable

The invention claimed is:

1. An installation structure for charging equipment in a rear vehicle body, comprising:
    a rear floor panel disposed in the rear vehicle body;
    a spare tire housing disposed at a position with a distance in a longitudinal direction of vehicle from a rear edge of the rear floor panel, the spare tire housing having a recessed shape projecting downward in a vehicle;
    a charger for charging a battery disposed in the spare tire housing; and
    a charging connector connected to the charger through an outlet cable, the charging connector capable of supplying power to the charger, wherein
    the charging connector is disposed rearward of vehicle in the spare tire housing,
    an insertion hole is formed in a peripheral wall of the spare tire housing,
    a cover member is joined to the rear floor panel so as to form a closed cross section,
    the cover member is disposed to extend from the peripheral wall of the spare tire housing toward the charging connector so as to communicate space defined by the closed cross section with the insertion hole, and
    the outlet cable is disposed so as to be inserted through the insertion hole and the space defined by the closed cross section.

2. The installation structure for charging equipment in the rear vehicle body according to claim 1, wherein
    the insertion hole is disposed in the peripheral wall rearward of vehicle in the spare tire housing.

3. The installation structure for charging equipment in the rear vehicle body according to claim 1, wherein
    the cover member extends from the peripheral wall of the spare tire housing to a rear edge of the rear floor panel.

* * * * *